(12) United States Patent
Telman et al.

(10) Patent No.: US 12,110,840 B2
(45) Date of Patent: Oct. 8, 2024

(54) TURBINE ENGINE SEPARATE FLOW MIXER WITH LOBES

(71) Applicant: SAFRAN AIRCRAFT ENGINES, Paris (FR)

(72) Inventors: Cyrille Telman, Moissy-Cramayel (FR); Pierre Vincent, Moissy-Cramayel (FR); Olivier Arnaud Fabien Lambert, Moissy-Cramayel (FR); Simon José Pierre Amoedo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/608,292

(22) PCT Filed: Apr. 3, 2020

(86) PCT No.: PCT/EP2020/059584
§ 371 (c)(1),
(2) Date: Nov. 2, 2021

(87) PCT Pub. No.: WO2020/224890
PCT Pub. Date: Nov. 12, 2020

(65) Prior Publication Data
US 2022/0213848 A1 Jul. 7, 2022

(30) Foreign Application Priority Data

May 3, 2019 (FR) .......................................... 1904664

(51) Int. Cl.
*F02K 1/38* (2006.01)
*F02K 1/48* (2006.01)

(52) U.S. Cl.
CPC ................ *F02K 1/386* (2013.01); *F02K 1/48* (2013.01); *F05D 2250/184* (2013.01); *F05D 2250/611* (2013.01); *F05D 2300/50212* (2013.01)

(58) Field of Classification Search
CPC ... F02K 1/386; F02K 1/48; F02K 1/46; F05D 2250/61; F05D 2250/611; F05D 2250/184
See application file for complete search history.

(56) References Cited

U.S. PATENT DOCUMENTS 4,548,034 A * 10/1985 Maguire ................. F02K 1/386
60/264
6,606,854 B1 * 8/2003 Siefker ................. B63G 13/02
60/264
(Continued)

FOREIGN PATENT DOCUMENTS

| CN | 1912372 A | 2/2007 |
|---|---|---|
| EP | 1752649 A2 | 2/2007 |
| EP | 2546505 A2 | 1/2013 |

OTHER PUBLICATIONS

International Search Report in International Application No. PCT/EP2020/059584, mailed Jun. 16, 2020. (2 pages).
(Continued)

*Primary Examiner* — Gerald L Sung
*Assistant Examiner* — Jacek Lisowski
(74) *Attorney, Agent, or Firm* — Bookoff McAndrews, PLLC

(57) ABSTRACT

The invention relates to a turbine engine separate flow mixer centered on a longitudinal axis, comprising an exhaust housing, a shroud directly connected to the exhaust housing and intended to mix the flows originating in the turbine engine, said shroud comprising a metal sheet formed by a succession of first and second longitudinal strips distributed circumferentially around the longitudinal axis of the mixer
(Continued)

by circumferentially placing the second strips on either side of the first strips, the first and second strips being configured to form the shroud when at rest and grooves in the shroud when operating, the grooves being defined by an alternation of internal lobes and of external lobes.

11 Claims, 2 Drawing Sheets

(56) References Cited

U.S. PATENT DOCUMENTS

| | | | | |
|---|---|---|---|---|
| 8,826,669 | B2* | 9/2014 | Bouchard | F02K 1/827 |
| | | | | 60/770 |
| 10,246,196 | B2* | 4/2019 | Pautis | F02C 7/20 |
| 2002/0125340 | A1 | 9/2002 | Birch et al. | |
| 2005/0229585 | A1* | 10/2005 | Webster | F02K 1/383 |
| | | | | 60/262 |
| 2006/0010852 | A1* | 1/2006 | Gekht | F02K 1/386 |
| | | | | 60/262 |
| 2008/0041033 | A1* | 2/2008 | Durocher | F02K 3/06 |
| | | | | 60/39.5 |
| 2009/0134271 | A1* | 5/2009 | Baillard | B64D 27/40 |
| | | | | 244/54 |
| 2009/0178410 | A1 | 7/2009 | Straza | |
| 2010/0170261 | A1* | 7/2010 | Stieger | B64D 33/06 |
| | | | | 60/771 |
| 2011/0265447 | A1 | 11/2011 | Cunningham | |
| 2012/0117939 | A1* | 5/2012 | Sylla | F02K 1/48 |
| | | | | 60/226.1 |
| 2013/0017065 | A1* | 1/2013 | Webster | F02K 1/1207 |
| | | | | 415/148 |
| 2013/0327047 | A1 | 12/2013 | Webster | |
| 2014/0003911 | A1* | 1/2014 | Alexander | F01D 25/00 |
| | | | | 415/121.2 |
| 2014/0075919 | A1* | 3/2014 | Durocher | B21D 53/92 |
| | | | | 29/889.22 |
| 2014/0124289 | A1* | 5/2014 | Rose | F02K 1/48 |
| | | | | 181/213 |
| 2014/0165590 | A1* | 6/2014 | Jewess | F01D 25/162 |
| | | | | 60/797 |
| 2015/0337761 | A1* | 11/2015 | Marini | F01D 9/041 |
| | | | | 415/144 |
| 2020/0166004 | A1* | 5/2020 | Farah | F01D 25/162 |
| 2020/0240292 | A1* | 7/2020 | Stromberg | F01D 5/143 |

OTHER PUBLICATIONS

French Search Report in French Application No. 1904664, dated Jan. 10, 2020. (2 pages).
Written Opinion of the International Searching Authority in International Application No. PCT/EP2020/059584. (5 pages).

* cited by examiner

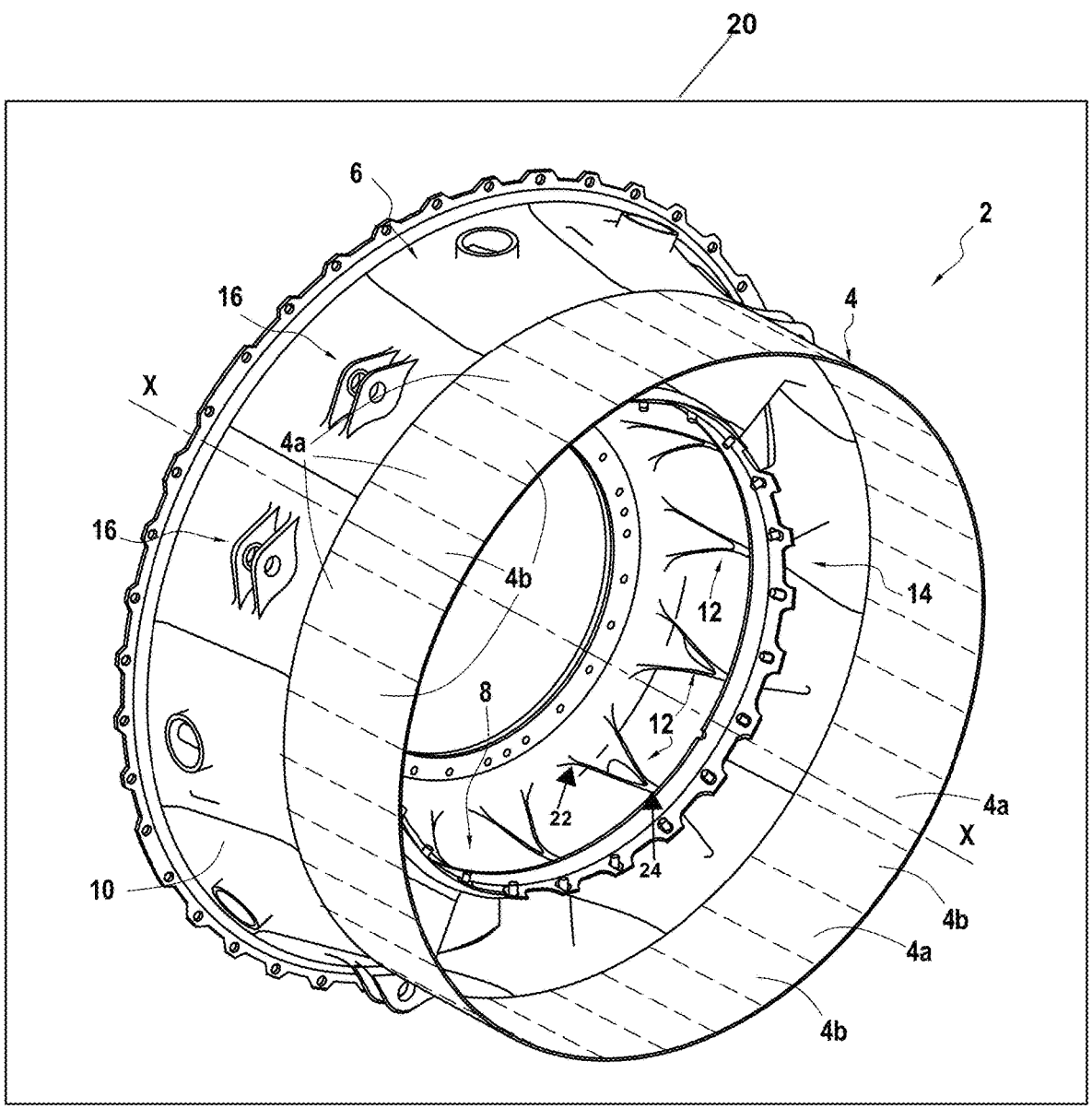
[Fig. 1]

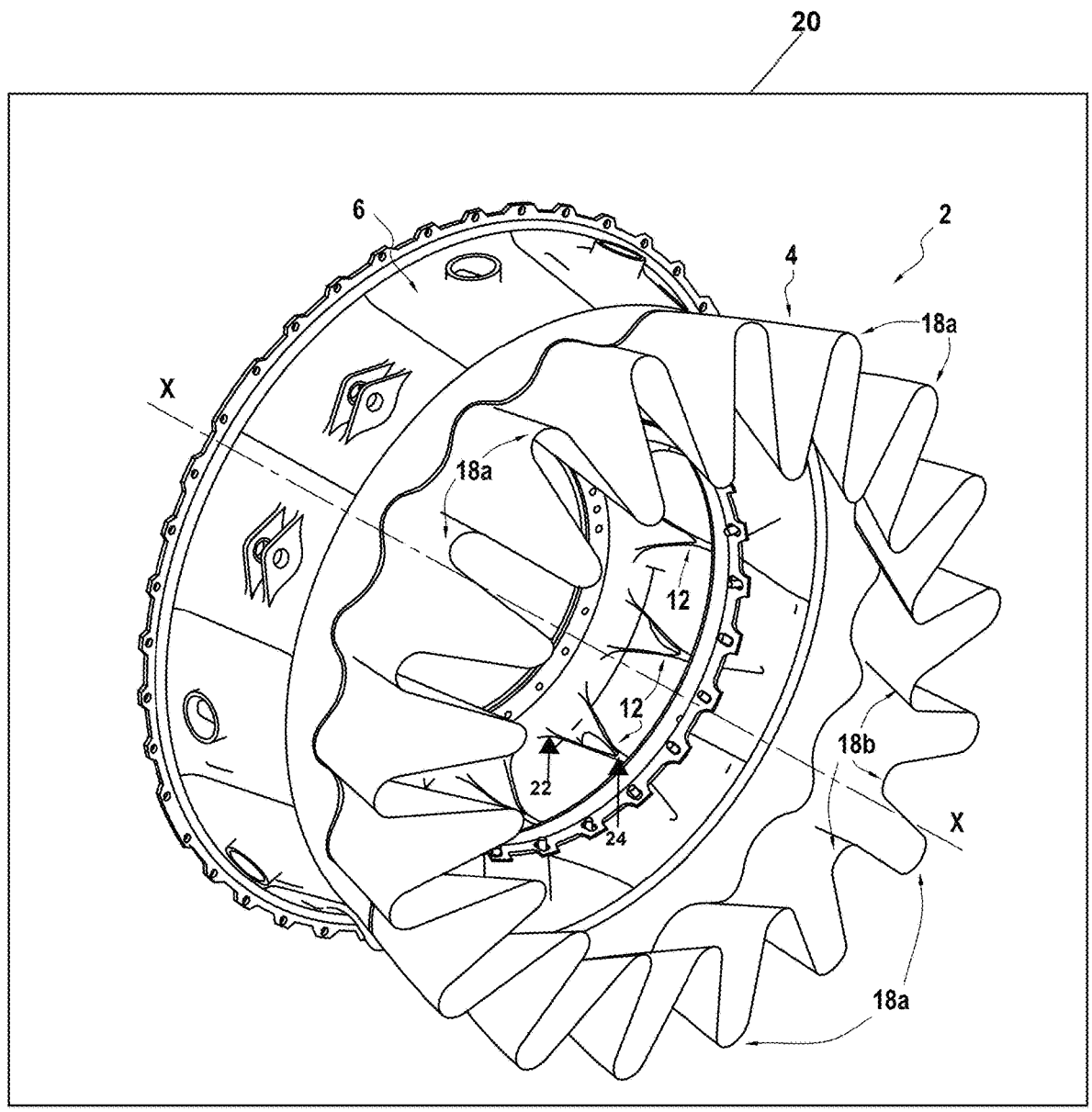
[Fig. 2]

TURBINE ENGINE SEPARATE FLOW MIXER WITH LOBES

CROSS-REFERENCE TO RELATED APPLICATIONS

This application is the U.S. national phase entry under 35 U.S.C. § 371 of International Application No. PCT/EP2020/059584, filed on Apr. 3, 2020, which claims priority to French Patent Application No. 1904664, filed on May 3, 2019.

TECHNICAL FIELD

The present invention relates to the general field of nozzles equipping airplane turbine engines. It relates more particularly to separate flow nozzles equipped with flow mixers which allow reducing the noise of the jet at the outlet of the nozzle, while still improving the performance of the engine.

BACKGROUND

Separate flow nozzles of turbine engines are generally composed of a converging flow nacelle containing a primary cowling defining a first annular channel for the passage of a primary flow (or hot flow) originating in the combustion chamber and a secondary cowling placed concentrically around the primary cowling so as to define a second annular channel for the passage of a secondary flow (or cold flow) originating in the fan.

In order to reduce the jet noise generated at the outlet of a nozzle of this type, it is known to use mixers having a specific design to favor mixing between the primary flow and the secondary flow originating in the turbine engine. One of the designs most used in civil turbine engines is that of the lobed mixer which allows obtaining radial shear between the primary and secondary flow in order to facilitate their mixing.

More precisely, this type of mixer appears in the form of a sinusoidal portion which is fastened to the attachment flanges of the exhaust housing of the nozzle and which has internal lobes alternating with external lobes, these lobes being distributed over the entire circumference of the exhaust housing.

With this type of mixer, the internal and external lobes form grooves (or chutes) radially guiding the secondary flow toward the channel in which the primary flow passes, and the external lobes form other chutes radially guiding the primary flow toward the channel in which the secondary flow passes. Thus, at the outlet of the mixer, the flows mix by shear in a direction which is essentially radial. A lobed mixer of this type has however a certain number of limitations. In particular, there exists a risk of potential leaks at the attachment flanges of the exhaust casing. Moreover, due to its sinusoidal shape, the difficulties of manufacturing a mixer of this type are great, so that it is generally manufactured in several parts which are welded to one another. However, the presence of numerous welds creates weaknesses at them in the mixer and is the cause of a loss of performance due to the poor surface condition inherent in weld beads.

DISCLOSURE OF THE INVENTION

The present invention therefore has as its main goal to propose a mixer for a separate flow nozzle which does not have such disadvantages.

In conformity with the invention, this goal is achieved due to a turbine engine separate flow mixer centered on a longitudinal axis, comprising an exhaust housing, a shroud directly connected to the exhaust housing and intended to mix the flows originating in the turbine engine, said shroud comprising a metal sheet formed by a succession of first and second longitudinal strips distributed circumferentially around the longitudinal axis of the mixer by circumferentially placing the second strips on either side of the first strips, the first and second strips being configured to form the shroud when at rest and grooves in the shroud when operating, the grooves being defined by an alternation of internal lobes and of external lobes.

The invention is remarkable in that it proposes to utilize an identical single metal sheet comprising strips with different thermal dilations aligned longitudinally with the arms of the exhaust housing to accomplish the sinusoidal portion of a lobed mixer. During the operation of the engine, the exhaust housing of the nozzle is heated and the parts situated downstream of it undergo a tangential thermal gradient due to the presence of the arms of the exhaust housing. The result is that the mixer shroud is also heated and, under the influence of the thermal gradients, corrugations of the metal sheet are generated. These generated corrugations thus form the different internal and external lobes of a conventional mixer.

The mixer according to the invention thus has numerous advantages, due in particular to the fact that the metal sheet forming the shroud and comprising the internal and external lobes is made is an identical single part, which avoids the disadvantages linked to the welds (weakness of the part and loss of performance in particular). In addition, this metal sheet can be connected directly to the exhaust housing of the nozzle with no need to resort to attachment flanges, which avoids the risk of potential leak at their level. Moreover, another advantage resides in the facility and the low repair costs of the shroud: in the event that it is damaged, it is sufficient to cut the damaged portion and to replace it with another which is directly brazed to the shroud.

The first and second strips of the shroud can have different thicknesses and/or be made of different materials depending on the desired thermal dilation for these strips.

The shroud can be connected to an external shroud of the exhaust housing by brazing. Alternatively, it can be connected to an external shroud of the exhaust housing by welding.

When operating, the mixer can be configured to obtain, when operating, a temperature difference of more than 100° C.—and preferably of more than 200° C.—between the first and second strips.

The first and second strips of the shroud are advantageously made of an aluminum-based material which has a high thermal dilation coefficient.

Preferably, each arm of the exhaust housing has a leading edge and a trailing edge, the trailing edge being axially aligned with a junction between the first and second strips of the shroud.

The invention also has as its object a turbine engine comprising a separate flow nozzle which is equipped with a mixer as previously defined.

BRIEF DESCRIPTION OF THE DRAWINGS

FIG. 1 is a schematic perspective view of a turbine engine separate flow mixer according to the invention in a so-called "cold" configuration.

FIG. 2 shows the mixer of FIG. 1 in a so-called "hot" configuration.

DESCRIPTION OF THE EMBODIMENTS

The invention applies to any turbine engine nozzle equipped with a separate flow mixer like that shown by FIG. 1.

In known fashion, the mixer 2 of a nozzle comprises in particular a shroud 4 which is centered on a longitudinal axis X-X of the separate flow mixer which is connected to an exhaust housing 6 of the turbine engine 20.

When hot, this shroud 4 appears in the form of a sinusoidal portion having internal lobes alternating with external lobes, these lobes being distributed over the entire circumference of the exhaust housing.

The internal lobes form grooves (or chutes) radially guiding the cold flow (or secondary flow) of the fan to the channel in which passes the hot flow (or primary flow) originating in the combustion chamber, and the external lobs for other chutes radially guiding the hot flow to the channel in which the cold flow passes. Thus, at the outlet of the mixer, the flow mix by shear in a direction which is essentially radial.

The exhaust housing 6 is typically placed behind the low-pressure turbine of the turbine engine 20 and ensures the inner and outer continuity of the stream, allowing separating the hot flow originating in the combustion chamber from the cold flow originating in the fan.

More precisely, the exhaust housing 6 comprises an annular shaped hub 8 which is centered on the longitudinal axis X-X, an external shroud 10 coaxial with the hub 8 with a diameter greater than the latter, and a plurality of arms 12 connecting the hub 8 to the external shroud 10.

The annular space 14 formed between the hub 8 and the external shroud 10 delimits the flow channel of the primary flow (or hot flow) at the outlet of the low-pressure turbine of the turbine engine 20.

The exhaust housing 6 also comprises several devises 16 protruding radially outward with respect to the external shroud 10 in order to form attachment points for fastening the exhaust housing to a pylon fastened to the wing of the airplane.

The arms 12 of the exhaust housing, which here for example are 18 in number, are regularly distributed around the longitudinal axis X-X of the mixer.

According to the invention, the shroud 4 of the mixer is formed by an identical single metal sheet which is directly connected to the external shroud 10 of the exhaust housing.

Preferably, the shroud 4 of the mixer is connected to the external shroud 10 of the exhaust housing of the nozzle by brazing or by welding. In particular, this connection is accomplished without having to utilize flanges and other attachment systems (such as screw/nut systems).

Still according to the invention, the shroud 4 of the mixer comprises a succession of first and second longitudinal strips 4a, 4b which are distributed circumferentially around the longitudinal axis X-X of the mixer, each of these first and second longitudinal strips 4a, 4b being aligned longitudinally with one of the arms 12 of the exhaust casing 6. Each arm 12 of the exhaust housing 6 may have a leading edge 22 and a trailing edge 24, the trailing edge 24 being axially aligned with a junction between the first and second strips 4a, 4b of the shroud 4.

More precisely, the distribution is accomplished at the outlet by alternating the second strips 4b, having a first temperature $T_1$ when hot, with first strips 4a having a second temperature $T_2$ when hot which is greater than the first temperature $T_1$. In other words, the second strips 4b are positioned circumferentially on either side of the first strips 4a.

The first and second strips 4a, 4b, are configured to form the shroud 4 of the mixer when at rest and to form grooves (or chutes) in the shroud when operating. More precisely, in operation, the first strips 4a are configured to form by dilation when hot the external lobes of the mixer, while the second strips 4b are configured to form, by dilation when hot, the internal lobes of said mixer.

The lobes which are thus formed preferably have an elongated shape.

FIG. 2 thus shows the mixer according to the invention, and more particularly its shroud 4, when it is "in the hot state," i.e. when the turbine engine 20 is operating at cruise speed.

In this figure, it is easy to see that the heating of the shroud 4 of the mixer induces a more or less great radial thermal dilation of it depending on the longitudinal strip 4a, 4b which composes it, this dilation giving a daisy shape to the mixer shroud. In other words, a circumferential gradient is imposed depending on the position of the first and second longitudinal strips 4a, 4b of the shroud 4 of the mixer.

By a thermomechanical calculation taking into account the hot temperature of the external shroud of the exhaust housing and the respective thermal dilation coefficients $C_{t1}$ and $C_{t2}$ of the first and second longitudinal strips of the mixer shroud, it is thus possible to create, in the hot state, an alternation of the external lobes 18a corresponding to the first longitudinal strips 4a and internal lobes 18b corresponding to the second longitudinal strips 4b.

For example, the shape of the external 18a and internal 18b lobes obtained in FIG. 1 was obtained by applying a thermal gradient of 200° C. to the mixer shroud (namely $T_1$=400° C. of the longitudinal strips 4b and $T_2$=600° C. for the longitudinal strips 4a) and for a uniform temperature of the exhaust housing equal to 600° C.

For the same material constituting the mixer shroud, there exists a thermal dilation coefficient curve as a function of the temperature. Thus, the mixer shroud initially has the same thermal dilation coefficient. On the other hand, when hot, the presence and the shape of the arms 12 of the exhaust housing 6 will have the effect of dilating the shroud to a more or less great degree, a dilation which manifests itself by a movement of the shroud given by the formula:

Movement (in mm)=radius of the shroud (in mm)×alpha (T)×(T−20° C.) with: alpha (T)=thermal dilation coefficient at temperature T and T=temperature The parameter alpha(T) therefore varies with the temperature and forms, when hot, the longitudinal strips of the shroud with a different thermal dilation coefficient.

It will be noted that the number of external lobes 18a is equal to the number of first longitudinal strips 4a (18 here) and that the number of internal lobes 18b is equal to the number of second longitudinal strips 4b (18 here).

Thus, to obtain the specified stream when hot, (i.e. the number and the shape of the external and internal lobes of the mixer), it is necessary to know the number of arms 12 of the exhaust housing 6, as well as the tangential temperature gradient. In fact, the exhaust housing imposes thermal differences downstream when on the pressure side and on the suction side of each of its arms. The parts situated downstream of the exhaust housing therefore undergo a tangential thermal gradient due to the presence of the arms of the exhaust housing.

As previously indicated, the first and second strips 4a, 4b of the shroud 4 of the mixer must each be aligned longitudinally with one of the arms 12 of the exhaust housing 6, and the number of arms corresponds to the number of external lobes and of internal lobes of the mixer.

Likewise, the shape of the arms 12 of the exhaust housing influences the means by which the mixer shroud 4 will deform when hot: the more convex the profile of the arm is, the greater the temperature gradient is, and will easily form the arms by deformation when hot.

In order to obtain different thermal dilations in the first and second strips 4a, 4b based on the same metal sheet, it is possible to adjust the thickness of the sheet for each strip: the first strips 4a can have a smaller thickness than the second strips 4b in order to confer upon them a flexibility for thermal dilation greater than that of the second strips 4b.

Of course, other arrangements can be made to confer different thermal dilations for the longitudinal strips of the mixer shroud.

In addition, if the tangential thermal gradient due to the presence of the arms of the exhaust housing is low, it is necessary to take a metal with a high thermal dilation coefficient to produce the mixer shroud 4. Conversely, if the tangential thermal gradient due to the presence of the arms is high, it will be necessary to limit the thermal dilation coefficient of the sheet metal forming the mixer shroud.

The invention claimed is:

1. A turbine engine separate flow mixer centered on a longitudinal axis, comprising an exhaust housing, a shroud directly connected to the exhaust housing and intended to mix flows originating in a turbine engine, wherein said shroud comprises a metal sheet formed by a succession of first longitudinal strips and second longitudinal strips distributed circumferentially around the longitudinal axis of the turbine engine separate flow mixer, the shroud having a first shape when at rest or in a cold configuration and a second shape different from the first shape when operating or in a hot configuration, and the first longitudinal strips and second longitudinal strips being configured to form the shroud when at rest and grooves in the shroud when operating, the grooves being defined by an alternation of internal lobes and of external lobes the first longitudinal strips and the second longitudinal strips having different thermal dilations when the shroud is operating and, wherein the exhaust housing comprises clevises protruding radially outward from the exhaust housing to fasten the exhaust housing to a pylon, an annular hub centered on the longitudinal axis, and coaxial with an external shroud of the exhaust housing, and wherein a plurality of arms connect the annular hub to the external shroud of the exhaust housing, wherein the annular hub is fully enclosed by the exhaust housing and is upstream of the shroud.

2. The turbine engine separate flow mixer according to claim 1, wherein the first longitudinal strips and the second longitudinal strips of the shroud are made of different materials.

3. The turbine engine separate flow mixer according to claim 1, wherein the shroud is connected to the external shroud of the exhaust housing by brazing.

4. The turbine engine separate flow mixer according to claim 1, wherein the shroud is connected to the external shroud of the exhaust housing by welding.

5. The turbine engine separate flow mixer according to claim 1, wherein the turbine engine separate flow mixer is configured to obtain, when the turbine engine separate flow mixer is operating, a temperature difference of more than 100° C. between the first longitudinal and the second longitudinal strips.

6. The turbine engine separate flow mixer according to claim 1, wherein the turbine engine separate flow mixer is configured to obtain, when the turbine engine separate flow mixer is operating, a temperature difference of more than 200° C. between the first longitudinal strips and the second longitudinal strips.

7. The turbine engine separate flow mixer according to claim 1, wherein the first longitudinal strips and second longitudinal strips of the shroud are made of an aluminum-based material.

8. The turbine engine separate flow mixer according to claim 1, wherein each arm of the exhaust housing having a leading edge and a trailing edge, the trailing edge being axially aligned with a junction between the first longitudinal strips and the second longitudinal strips of the shroud.

9. A turbine engine comprising a separate flow nozzle which is equipped with the turbine engine separate flow mixer according to claim 1.

10. The turbine engine separate flow mixer according to claim 5, wherein the plurality of arms of the exhaust housing are configured to obtain, when the turbine engine separate flow mixer is operating, the temperature difference of more than 100° C. between the first longitudinal strips and the second longitudinal strips.

11. The turbine engine separate flow mixer according to claim 6, wherein the plurality of arms of the exhaust housing are configured to obtain, when the turbine engine separate flow mixer is operating, the temperature difference of more than 200° C. between the first longitudinal strips and the second longitudinal strips.

* * * * *